(12) United States Patent
Ellbrant et al.

(10) Patent No.: US 11,946,416 B2
(45) Date of Patent: Apr. 2, 2024

(54) HEAT EXCHANGER INTEGRATION

(71) Applicant: GKN Aerospace Sweden AB, Trollhättan (SE)

(72) Inventors: Lars Ellbrant, Trollhättan (SE); Hans Mårtensson, Trollhättan (SE); Carlos Arroyo, Trollhättan (SE); Fredrik Wallin, Trollhättan (SE); Mattias Billson, Trollhättan (SE)

(73) Assignee: GKN Aerospace Sweden AB, Trollhättan (SE)

( * ) Notice: Subject to any disclaimer, the term of this patent is extended or adjusted under 35 U.S.C. 154(b) by 0 days.

(21) Appl. No.: 17/777,647

(22) PCT Filed: Nov. 19, 2020

(86) PCT No.: PCT/EP2020/082718
§ 371 (c)(1),
(2) Date: May 18, 2022

(87) PCT Pub. No.: WO2021/099482
PCT Pub. Date: May 27, 2021

(65) Prior Publication Data
US 2022/0412260 A1 Dec. 29, 2022

(30) Foreign Application Priority Data
Nov. 21, 2019 (GB) ...................... 1916989

(51) Int. Cl.
*F01D 9/04* (2006.01)
*F01D 25/12* (2006.01)
*F02C 7/12* (2006.01)

(52) U.S. Cl.
CPC ................. *F02C 7/12* (2013.01); *F01D 9/04* (2013.01); *F01D 25/12* (2013.01);
(Continued)

(58) Field of Classification Search
CPC ... F02C 7/12; F01D 9/04; F01D 25/12; F05D 2220/32; F05D 2240/12; F05D 2260/208
See application file for complete search history.

(56) References Cited

U.S. PATENT DOCUMENTS 3,830,058 A * 8/1974 Ainsworth ................ F02C 7/20
244/54
5,107,676 A * 4/1992 Hadaway ............ F16H 57/0482
60/39.08

(Continued)

FOREIGN PATENT DOCUMENTS

CN 109973224 A 7/2019
EP 2990335 A1 3/2016
(Continued)

OTHER PUBLICATIONS

International Search Report and Written Opinion for PCT/EP2020/082718 dated Feb. 15, 2021 (14 pages).
(Continued)

*Primary Examiner* — Eric J Zamora Alvarez
*Assistant Examiner* — Theodore C Ribadeneyra
(74) *Attorney, Agent, or Firm* — Bejin Bieneman PLC

(57) ABSTRACT

A front centre body (FCB) structure for a geared turbofan engine comprises a plurality of vanes extending across the inlet duct to a low pressure compressor and integrates a heat exchanging arrangement to control the temperature of the gearbox of the turbofan engine.

18 Claims, 9 Drawing Sheets

(52) U.S. Cl.
CPC ...... *F05D 2220/32* (2013.01); *F05D 2240/12* (2013.01); *F05D 2260/208* (2013.01)

(56) References Cited

U.S. PATENT DOCUMENTS

| | | | | |
|---|---|---|---|---|
| 5,729,969 | A * | 3/1998 | Porte | F02C 7/185 60/782 |
| 7,373,773 | B2 * | 5/2008 | Noda | F02C 7/18 60/39.5 |
| 8,616,834 | B2 * | 12/2013 | Knight, III | F01D 25/12 415/176 |
| 8,979,477 | B2 * | 3/2015 | Johnson | F01D 25/162 415/111 |
| 9,546,567 | B2 * | 1/2017 | Kasibhotla | F01D 25/30 |
| 9,945,325 | B2 * | 4/2018 | Roberge | F02C 7/06 |
| 10,329,956 | B2 * | 6/2019 | Scott | F01D 9/065 |
| 10,830,056 | B2 * | 11/2020 | Erno | F01D 9/065 |
| 11,130,582 | B2 * | 9/2021 | Smith | F02C 7/047 |
| 11,255,221 | B2 * | 2/2022 | Zatorski | F01D 25/16 |
| 11,448,131 | B2 * | 9/2022 | Rambo | F02C 7/18 |
| 2006/0042223 | A1 | 3/2006 | Walker et al. | |
| 2007/0215326 | A1 * | 9/2007 | Schwarz | F01D 25/18 165/96 |
| 2008/0095611 | A1 * | 4/2008 | Storage | F28F 1/022 415/116 |
| 2011/0081228 | A1 * | 4/2011 | Durocher | F01D 5/18 415/115 |
| 2012/0227371 | A1 * | 9/2012 | Johnson | F01D 9/065 60/39.83 |
| 2014/0182972 | A1 * | 7/2014 | Hetherington | F02C 7/06 184/6.11 |
| 2015/0285186 | A1 * | 10/2015 | Roberge | F02C 7/14 60/39.83 |
| 2016/0160686 | A1 * | 6/2016 | Cigal | F16H 57/045 184/6.11 |

FOREIGN PATENT DOCUMENTS

| | | |
|---|---|---|
| EP | 3040583 A1 | 7/2016 |
| EP | 3109411 A1 | 12/2016 |
| GB | 937826 A | 9/1963 |
| GB | 1322405 A | 7/1973 |
| GB | 2234035 A | 1/1991 |
| WO | 2014130103 A2 | 8/2014 |
| WO | 2021/099482 A1 | 5/2021 |

OTHER PUBLICATIONS

UKIPO Combined Search and Examination Report under Sections 17 and 18(3) for Application No. GB1916989.5 dated Mar. 11, 2020 (6 pages).

UKIPO Office Action for Application No. GB1916989.5 dated Jan. 5, 2022 (3 pages).

* cited by examiner

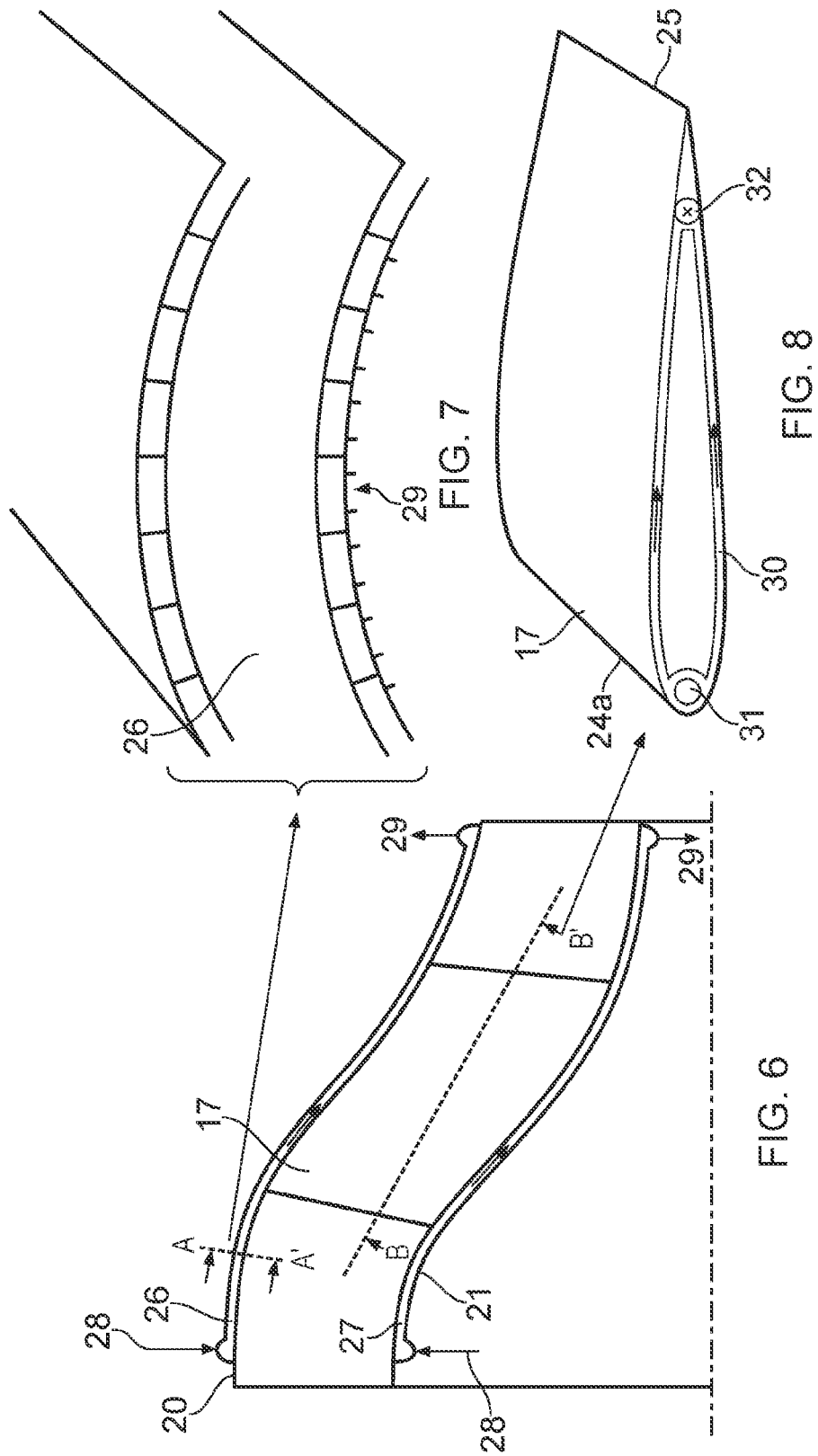

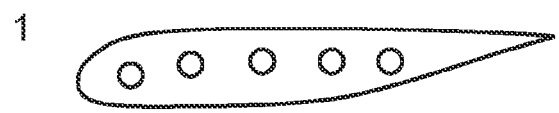
A
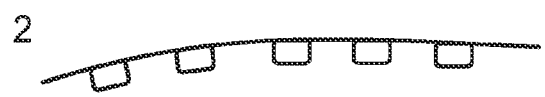
Gas path / by pass channel
B
Gas path / by pass channel
C
FIG. 10

HEAT EXCHANGER INTEGRATION

CROSS-REFERENCE TO RELATED APPLICATIONS

This application is a national stage of, and claims priority to, Patent Cooperation Treaty Application No. PCT/EP2020/082718, filed on Nov. 19, 2020, which application claims priority to Great Britain Application No. GB 1916989.5, filed on Nov. 21, 2019, which applications are hereby incorporated herein by reference in their entireties.

BACKGROUND

Geared turbo fan engines are capable of offering higher propulsive efficiencies when compared to conventional gas turbine engines. This is achieved by providing a gearbox which is located between the fan (at the front of the engine) and the drive shaft of the engine (which is itself driven by the turbine at the rear of the engine). Rotation of the drive shaft causes rotation of the gearbox which in turn causes rotation of the fan.

Depending on the gearbox being used the gear ratio can be selected to match the optimal rotational speed of the engine and/or to maximise the rotational speed of the fan. For example, epicyclic gearboxes provide extremely high gear ratios within a compact housing and are commonly used in geared turbo fan designs.

Operating a gearbox that is coupled to the drive shaft of a gas turbine engine can lead to extremely high rotational speeds and consequential heat generation. Even though epicyclic gearboxes can be highly efficient (in the order of 99.5% efficiency) the energy loss is dissipated as heat.

In order to cool the gearboxes, conventional arrangements use cold air in the bypass channel of the engine to cool the gearbox and remove and control the heat. This allows a gearbox to be conveniently cooled using the cold air in the bypass channel. An oil passage from the gearbox to a heat exchanger located proximate to the outer bypass channel of the engine is used to exchange heat from the oil in the gearbox to the cold air passing through the bypass channel. The gearbox can thereby be cooled.

Although such an arrangement increases the weight and complexity of the bypass channel, it advantageously allows for the convenient cooling of the gearbox using the cold abundant air that passes at high speed through the bypass channel of the engine. Such conventional arrangements have sufficient cooling capability to cool even large and higher ratio gearboxes.

SUMMARY

The present disclosure is concerned with an improved geared turbofan engine and in particular to a front centre body (FCB) of such an engine. More specifically the disclosure is concerned with a cooling arrangement for geared turbo fan engines. Aspects are set out in the accompanying claims.

Disclosed herein is a counterintuitive way in which a gearbox in a geared turbofan engine may be cooled. The arrangement allows for the cooling of a gearbox, such as an epicyclic gearbox, in a more compact and efficient manner with fewer components and complexity. The arrangement also allows for a weight saving in respect of the cooling system for the gearbox which advantageously also reduces the overall weight of the engine.

Viewed from a first aspect there is provided a front centre body (FCB) structure for a geared turbofan engine, the FCB comprising a central hub and a coaxial shroud spaced from said hub and defining an annular passage between the hub and shroud for communicating air to a compressor, the body comprising a plurality of vanes extending across the passage from the hub to the shroud, wherein one or more vanes is/are provided with a fluid passage within the vane extending from and returning to a portion of the vane intersecting with the hub.

The fluid passages in the vanes provide a fluid path for a coolant allowing each vane to function as a heat exchanging structure capable of dissipating heat into the airflow passing on and around a vane. The annular passage is the inlet duct to the low pressure compressor.

Such a configuration is a substantial departure from conventional thinking about gas turbine engine design. It is very well known practice to introduce the coldest possible air into the compressors of the gas turbine. This maximises compression. According to an arrangement described herein, heat is deliberately introduced into the inlet duct of the compressor which is counterintuitive.

Advantageously each fluid passage may be contained within the respective vane. In doing so the vane does not act as a conduit through which a pipe merely passes but instead acts as a heat exchanger by virtue of the fact that the passage is contained within the vane to dissipate heat.

Each of the vanes may extend between the hub and the shroud and intersect with each at opposing radial ends of the vane. The vanes may be evenly circumferentially spaced around the hub. This advantageously allows for heat transfer around the circumference of the hub with each vane extending radially from the hub through the airflow entering the compressor.

Each vane may advantageously have a fluid inlet from the hub to the vane and a fluid outlet from the vane to the hub. The fluid passage may then be arranged in use to communicate a coolant from a gearbox of the geared turbofan engine through one or more vanes via a respective inlet and outlet. Thus, each passage within the vanes provides part of a coolant circuit for a gearbox. The coolant may be the gearbox oil itself or it may be a secondary circuit coolant which has gathered heat from the gearbox via a suitable heat exchanging arrangement in or on the gearbox.

The vanes may advantageously be hollow to minimise weight. Each vane has a peripheral wall having an outer surface against which air is configured to flow and an opposing inner surface facing into the hollow vane. The vanes act to guide air entering the engine into the compressor and consequently the high speed air impinges on the outer surface of the vane causing the vane to reduce in temperature. To take full advantage of the lower temperature of the wall of the vane, the fluid passage may be arranged to be proximate to the inner surface of the vane. This thereby maximises heat dissipation from the fluid path and into the airflow passing over the vane surface.

The fluid passage may have any suitable path within each vane. For example the path may alternate in direction from the hub towards the shroud and from the shroud towards the hub in a reciprocating or serpentine shape. This maximises the contact of fluid in the passage with the cold vane wall.

The fluid passages may be in contact with the inner surface of the vane wall to fully maximise contact and to cause heat dissipation by conduction into the vane wall. Furthermore, to further optimise heat dissipation, the fluid passages may be arranged at or towards the leading edge of the vane. At the leading edge the air impinges directly against the vane surfaces creating a cold zone along the leading edge of the vane. Thus, the fluid passages may be proximate or run along the leading edge portion of the vane.

Alternatively, or additionally, the fluid passages may be in the form of a cavity arranged within the wall of the vane. For example, at least one cavity may be provided between inner and outer surfaces of a vane to define at least one of the fluid passages within said vane. Such an arrangement provides a large surface area against which the coolant may flow. The cavity may advantageously extend from the leading edge of the vane towards the trailing edge of the vane. This may be applied on the pressure and/or suction sides of the vane. In effect either side surface of the vane may be used as a heat exchanging surface. Since air continuously impinges against and flows over the vane surfaces in flight, this provides a highly effective heat transfer surface.

To still further enhance the heat transfer properties of the inlet duct to the compressor the hub and shroud surfaces may also be used as heat exchanging surfaces. Specifically, the shroud may be provided with a circumferential cavity extending between a radially inward wall and a radially outward wall. The cavity may extend along all or part of the axial length of the annular passage. For example the cavity may extend towards the compressor from the leading edge of the inlet duct to the same distance as the trailing edge of the vane.

Similarly, the hub may be provided with a circumferential cavity extending between a radially inward wall and a radially outward wall. Again the cavity may extend along all or part of the axial length of the annular passage, for example from the inlet of the duct to the trailing edge of the vane. The cavity in the shroud and/or hub may conveniently extend between adjacent vanes.

In effect, a heat exchanger is created with 4 sides, the 4 sides enclosing the space between two adjacent vanes of the low pressure compressor inlet duct. This optimises the heat transfer property of the inlet guide vane structure.

All or a subset of the vanes, shroud and hub surfaces may be used for heat transfer depending on the cooling needs of the gearbox and the radial size of the hub and shroud (the larger the diameter of hub/shroud the larger the circumferential area and radial length of the vanes).

The coolant or fluid may be introduced into the vane at any suitable position. Advantageously, the coolant or fluid may be introduced at an upstream end of a vane and an outlet is at a downstream end of a vane. The hottest coolant can thereby be introduced towards the leading edge of the vane to maximise heat transfer.

The fluid passages and cavities forming the 4 heat transfer zones may advantageously be in fluid communication with each other such that coolant can flow through each passage/cavity to effect cooling. For example coolant may be simultaneously (or sequentially) introduced towards the leading edge of each vane, hub and shroud.

Additionally, or alternatively, fluid may be permitted to flow from one group of 4 cooling surfaces to an adjacent group circumferentially around the hub. This may enhance cooling of the coolant by cooling the coolant in stages.

Viewed from another aspect there is provided a geared turbofan engine comprising a structure as described herein.

Viewed from yet another aspect there is provided a geared turbofan engine comprising at least one inlet duct arranged in use to communicate air to a low pressure compressor, wherein the inlet duct(s) comprise a plurality of vanes and wherein one or more vanes is/are provided with an internal heat exchanger in thermal communication with a gearbox of said engine.

Viewed from a still further aspect there is provided a method of cooling a gearbox in a geared turbofan engine, said method comprising the steps of causing a coolant to collect heat from a gearbox of the engine and to dissipate the heat through at least one vane located in an inlet to a low pressure compressor of said engine.

As discussed above using the compressor inlet as a heat exchanger is inherently counterintuitive. However, the inventors have established that the amount of heat introduced, whilst being detrimental to the performance of the compressor, is not catastrophic to performance. In fact, the disadvantages of the decrease in performance are outweighed by the significant advantages the arrangement provides.

For example, the arrangement described herein provides a number of advantages including:
1. Part count is reduced. The components conventionally needed to cool the gearbox in a geared turbofan engine can be reduced including reducing the pipework that is needed to communicate fluid out to the bypass channel and back.
2. Compact solution. The arrangement takes full advantage of the FCBs wetted surface area (surface against which air flows) to achieve the heat exchanging effect.
3. Added functionality. The FCB is provided with an integrated heat exchanging function.
4. Reduced Oil Frothing. The compact arrangement reduces the potential for air and oil to mix together creating a 'froth' within the gearbox.
5. Reduced Oil Volume. The reduction in size of the arrangement allows for a reduction in the oil volume needed to cool the gearbox.

The cooling arrangement described herein may additionally be adapted to be in fluid communication with heat exchangers in or around the bypass channel of the engine. Fluid channels proximate to the airflow within the bypass channel may conveniently radiate heat from a cooling fluid to the high speed airflow in the bypass channel. By fluidly connecting the front centre body heat exchanger described herein with such a bypass channel arrangement additional cooling may be selectively operated in extreme temperatures. This augments the arrangement described herein to provide a high capacity cooling arrangement.

An invention described herein may extend to a gearbox control arrangement in which fluid controlling valves are operable to effect cooling in response to temperatures sensors within the gearbox or within the gearbox fluid.

BRIEF DESCRIPTION OF THE DRAWINGS

One or more embodiments will now be described, by way of example only, and with reference to the following figures in which:

FIG. 6 shows a fluid passage through a single vane which intersects with the shroud and hub;

FIG. 7 shows a cross section through the wall of the shroud;

FIG. 8 shows a cross-section through the vane;

FIGS. 10A, 10B and 10C illustrate arrangements of fluid paths adjacent to the inner surface of the vane.

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The disclosure is further described with reference to the examples described herein. It will be appreciated that the invention as claimed is not intended to be limited in any way by these examples. It will also be recognised that the disclosure covers not only individual embodiments but also combination of the embodiments described herein.

DETAILED DESCRIPTION

Figure 1:
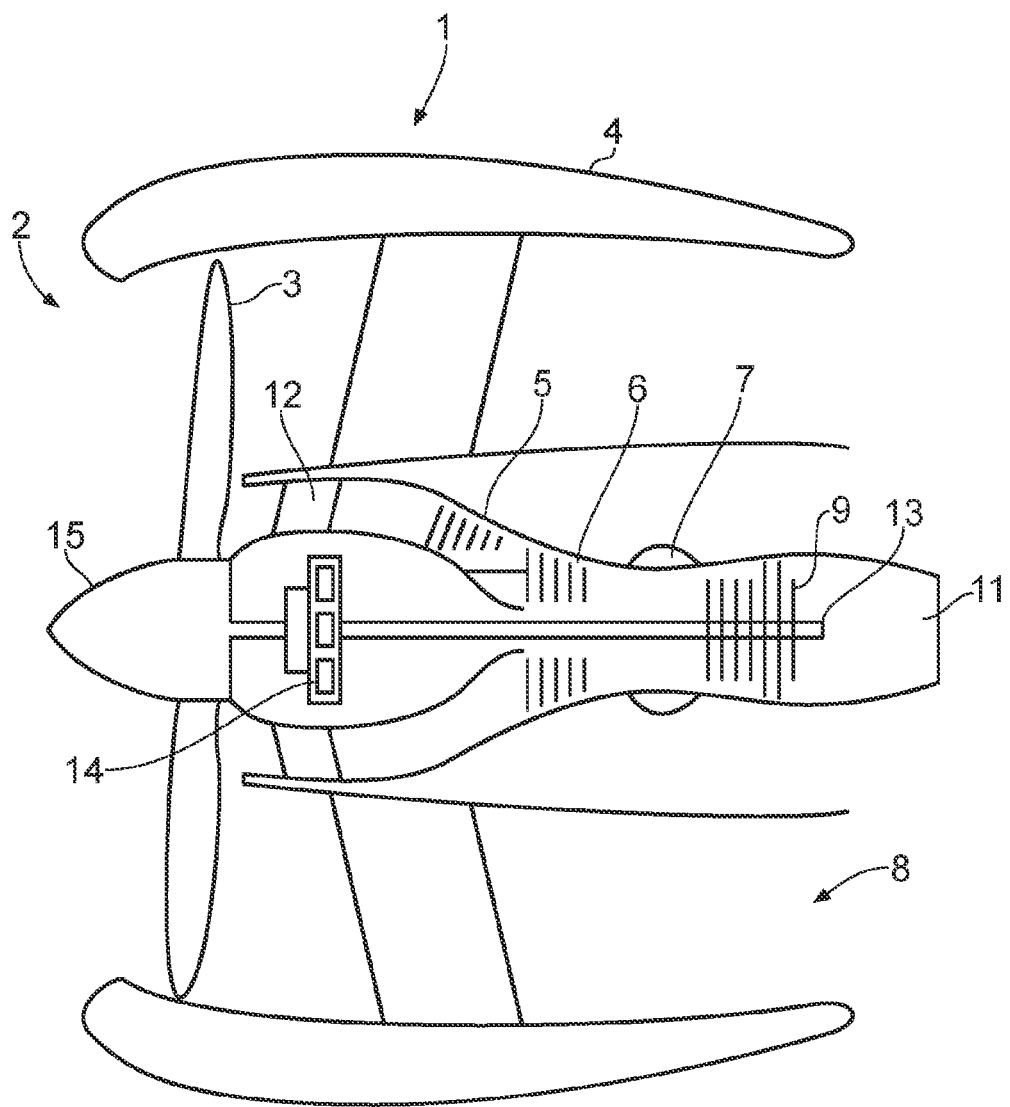
FIG. 1 shows a cross-section of a geared turbo fan engine.

FIG. 1 shows a cross-section of a geared turbo fan engine 1 incorporating a duct as described in detail below.

The skilled person will understand the principal components of a gas turbine engine and their operation. In summary the engine 1 comprises an air intake 2 which permits air to flow into the engine to the fan 3 located at the upstream end of the engine. All of the components are housed within the engine nacelle 4.

The engine comprises a bypass channel downstream of the fan and a central engine core which contains the compressors, combustors and turbines. The core of the engine is formed of a first low pressure compressor 5 and a second high pressure compressor 6. This multi-stage compressor arrangement takes air from ambient pressure and temperature to high temperature and pressure. Compressed air is then communicated to the combustion chamber 7 where fuel is injected and combustion occurs.

The combustion gases are expelled from the rear of the combustions chamber 7 and impinge first on a high pressure turbine 9 and then on a second low pressure turbine before leaving the rear of the engine through the core nozzle 11. Thrust from the engine is created by two gas flows: a first from the fan nozzle 8 (receiving thrust from the fan) and secondly from the exhaust gases from the core nozzle 11.

Turning to the operation of the engine, a geared turbofan (GTF) is distinguished from a normal gas turbine engine because the centrally located shaft 13, which runs along the length of the engine, is coupled at an upstream end to a gearbox 14. The gearbox allows the fan to rotate at a different speed to the compressor and allows the relative speeds of the fan and compressor to be optimised. Specifically the gearing ratio allows the fan to rotate at a lower speed than the compressor.

In order to save weight a convenient gearbox to use is an epicyclic gearbox, that is a gearbox with a centrally located sun gear and a plurality (normally 3) of circumferentially positioned planetary gears that are meshed with the central sun gear and rotate relative to the sun gear when the sun gear is itself rotated (in this case by the compressor shaft 13).

Depending on how the gearbox is configured (which will be well understood by someone skilled in the art) the output of the gearbox may be connected to the planetary gears (by means of a gear carrier) or alternatively to an annular gear surrounding the planetary gears (and also meshed thereto).

In the present case the output of the gearbox is coupled to the fan blade hub 15 which comprises a plurality of fan blades 3. In operation the low pressure shaft drives the gearbox which in turn drives the fan. Air is then driven through the engine through the bypass channel 8 and through the core (containing the compressors and combustors).

Although GTF engines are highly efficient, a drawback with their design is that the gearbox can become extremely hot and requires cooling. Cooling is conventionally achieved by means of a large oil reservoir, pump and cooling circuit. The cooling circuit fluidly connects the sump of the gearbox (that is the gearbox body containing the coolant and lubricant) to a heat exchanger which can dissipate heat from the coolant (typically an oil) and return the coolant back to the gearbox. Thus, the gearbox can be conveniently cooled using such a cooling circuit in combination with a pump. The heat exchanger may be conveniently located on an outer surface of the engine for example so as to benefit from the cold airflow the engine will experience at altitude when the gearbox is operating at maximum speed. This additionally removes heat from the engine which would otherwise increase the overall operating temperature of the engine. In a GTF engine the heat that is needed to be dissipated from the gearbox is substantially higher than normal requiring additional heat exchanging capacity within or around the bypass channel.

According to the present disclosure an unconventional approach is used wherein cooling is performed inside the engine and specifically inside the ducting used to supply air to the compressors.

As described below, according to the present disclosure heat is exchanged into the duct which introduces air into the engine core (or low pressure compressor). Convention in the industry says that it is hugely disadvantageous to engine performance to heat air entering the compressor. Consequently conventional arrangements use the conveniently abundant cold air that is available in and around the bypass channel.

Figure 2:
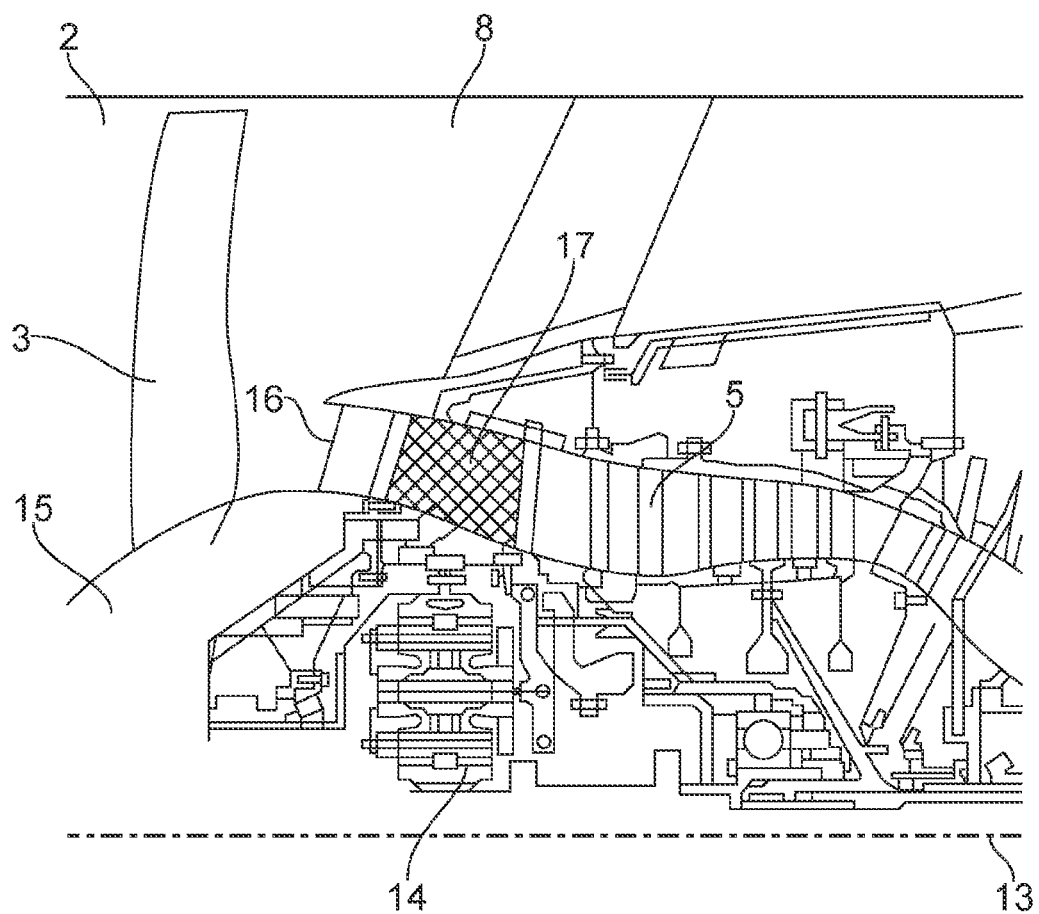
FIG. 2 shows a cross-section through a geared turbofan engine.

Turning to FIG. 2 a cross-section through a geared turbofan engine is shown.

The GTF engine comprises an inlet duct 16 which receives air passing through the blades 3. The inlet duct 16 comprises a plurality of guide vane 17 illustrated by the hatched cross-section 17 in FIG. 2. It will be appreciated that the inlet duct is a circumferentially extending annular passage surrounding the hub and arranged to communication air to the low pressure compressor 5, which also extends around the periphery of the axis 13. Air is ingested into the compressor 5 through the duct 16 and past a plurality of radially extending guide vanes 17. The guide vanes are hollow and act to direct the airflow towards the compressor 5.

Conventional gearbox cooling is achieved by using the cold air in the bypass channel 8 where air can be diverted into heat exchangers. In contrast the present disclosure provides cooling for the gearbox within the core section of the engine, and specifically in the air inlet guide vanes 17.

Figure 3:
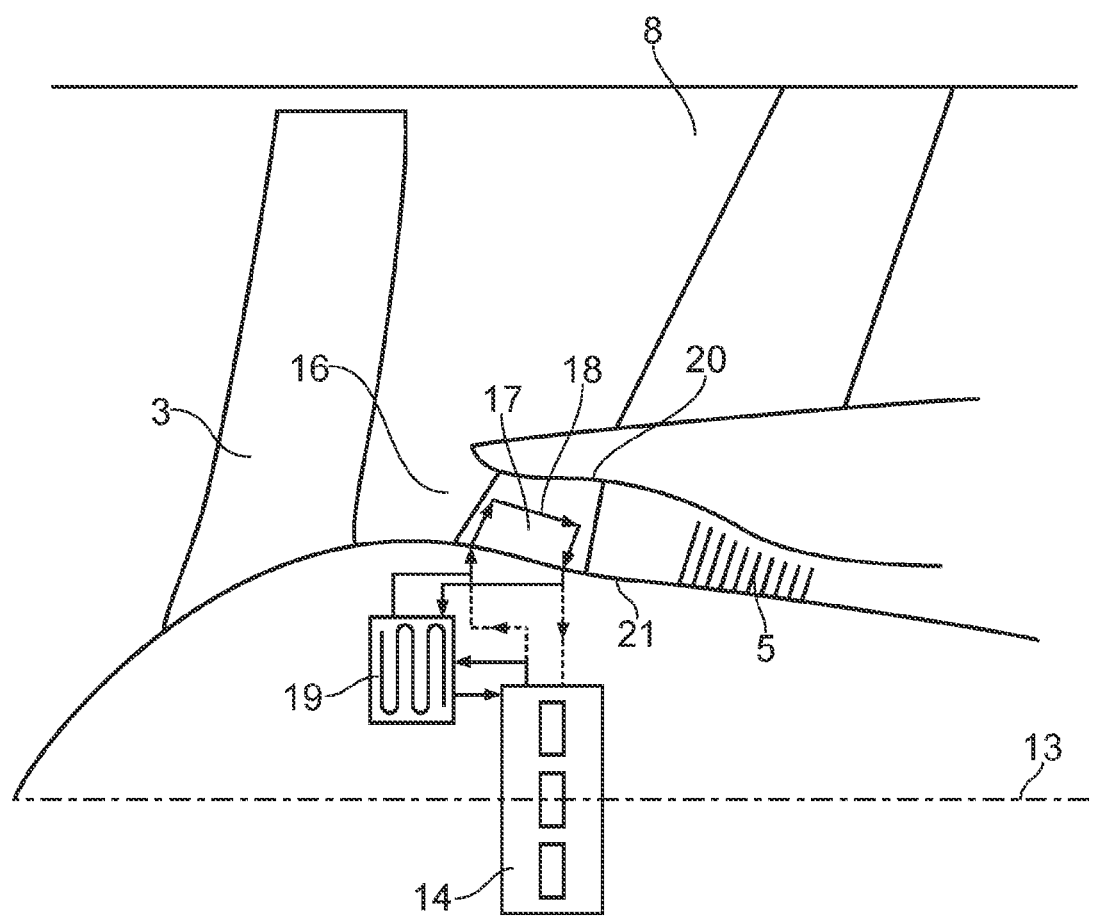
FIG. 3 shows a cross-section through a heat exchanger arrangement described herein.

As illustrated schematically in FIG. 3 a coolant path 18 is arranged within the guide vane 17. The coolant 18 originates from the gearbox 17 where heat is generated by the rotation and meshing of the gears. A lubricant or coolant, such as an oil, is used to collect heat within the gearbox 14. The oil is then directed to the coolant path or passage 18 either directly or via a primary heat exchanger 19. The coolant may be arranged to flow directly to the flow path or passage 18 (illustrated by the dotted lines) or may be arranged to flow through the heat exchanger (the operation of which will be understood by someone skilled in the art).

The flow of coolant from the gearbox, either directly or indirectly, to a heat exchanging arrangement within the guide vane 17 is, as described above, entirely counterintuitive.

FIG. 3 also illustrates the shroud 20 and the hub 21. The surface of the hub 21 rotates with the engine and the shroud remains static. The annular space between the hub and shroud defines the inlet duct 16 to the compressor 5. The annular space extends circumferentially around the engine core.

Figure 4:
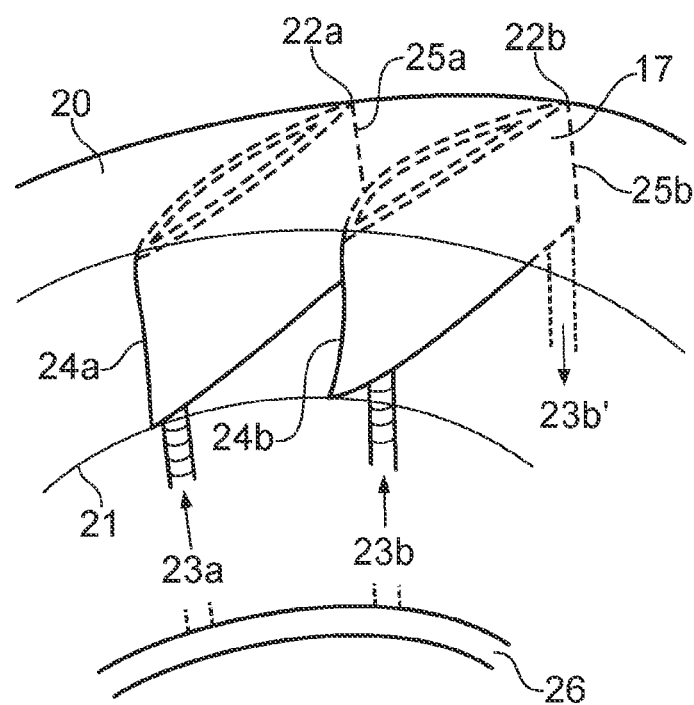
FIG. 4 shows a pair of guide vanes incorporating a heat exchanging conduit.

FIG. 4 illustrates a pair of adjacent vanes 22a, 22b. The vanes extend between the outer surface of the hub 21 where they both intersect and the inner surface of the shroud 20, again where they intersect. As illustrated in FIG. 4 each vane 22a, 22b is provided with a fluid/coolant inlet 23a, 23b and an associated fluid/coolant outlet 24b (23b not being visible in FIG. 4). Each vane has a leading edge 24a, 24b and a trailing edge 25a, 25b. Leading edge means leading in an airflow perspective.

As illustrated in FIG. 4 fluid or coolant may advantageously be introduced towards the leading edge of the vane. Thus, the fluid/coolant at the highest temperature is introduced into the vane at its coldest zone i.e. the leading edge. Fluid or coolant may be introduced, for example, from a circumferential manifold 26 allowing each vane to be in fluid communication with the gearbox or gearbox heat exchanger.

As airflow passes between the adjacent vanes and between the hub 21 and shroud 20 the air is caused to impinge on a number of surfaces maximising heat exchange. This is shown in FIG. 5.

Figure 5:
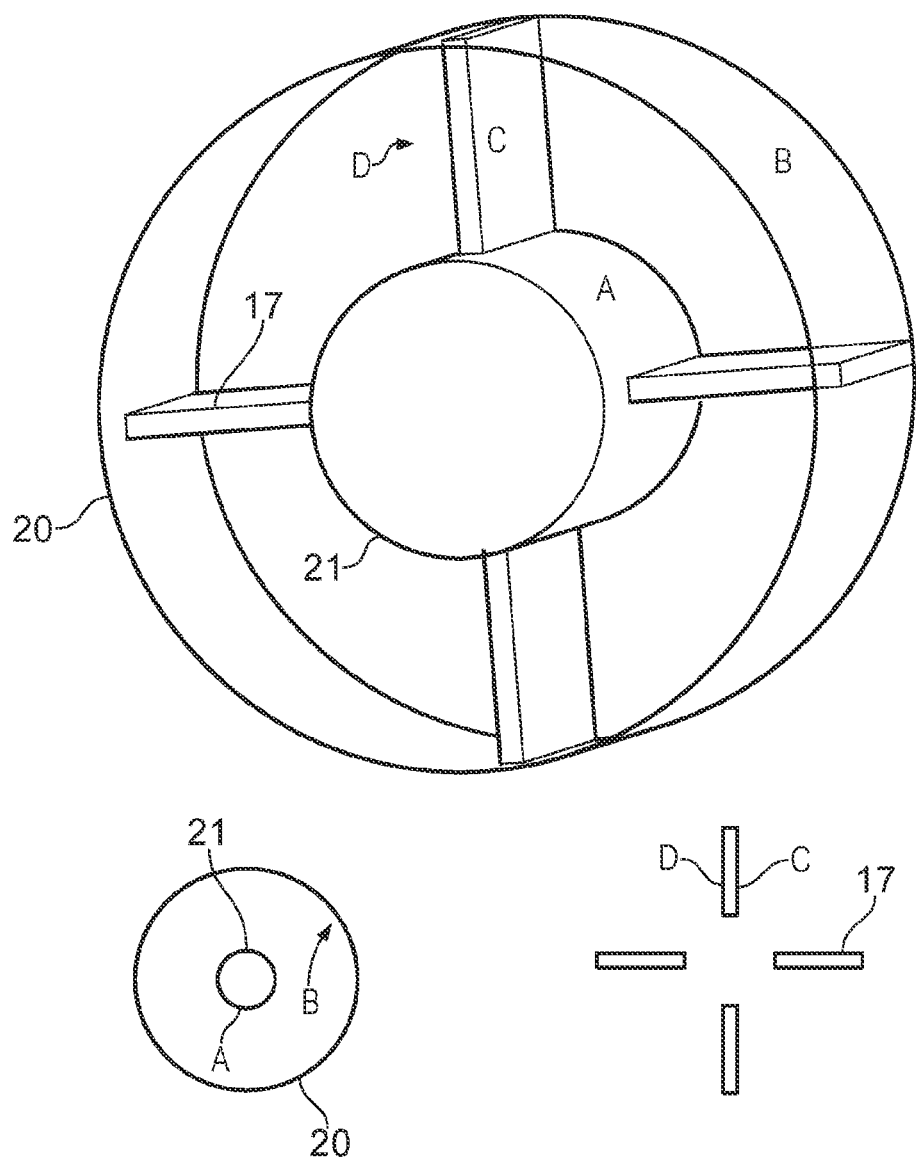
FIG. 5 illustrates the cooling zones of the front centre body.

FIG. 5 illustrates a simplified inlet duct with only 4 vanes 17. The surfaces against and along which heat transfer can take place are illustrated by:
A—the hub outer surface;
B—the shroud inner surface;
C—the vane pressure side; and
D—the vane suction side.

Thus, heat exchange can occur on any of the faces of the duct facing the airflow.

FIGS. 6, 7 and 8 illustrate one arrangement of the fluid passages within the vane and shroud/hub.

FIG. 6 shows a cross-section through a single vane 17 which intersects with the shroud 20 and hub 21. FIG. 6 also illustrates a shroud cavity 26 and a hub cavity 27 which are formed within the walls of the shroud and hub and which are arranged immediately adjacent to the airflow channel (the duct). The two cavities extend, as shown, along the length of the channel.

FIG. 6 also illustrates coolant inlets 28 and coolant outlets 29. The inlets and outlets allow coolant to be introduced into the cavities 26, 27 and to flow along each cavity (adjacent to the wall of the shroud and hub) towards their respective outlets. This thereby allows heat exchange to take place via conduction of heat from the coolant in the cavities to the airflow within the airflow channel.

Turning to FIG. 7 a cross-section A-A' through the shroud 21 is shown. As shown the cavity is formed between an inner wall and outer wall of the shroud (or a portion of the shroud close to the duct). This cavity receives and communicates coolant, such as oil, along the cavity from the inlet to the outlet.

FIG. 7 also illustrates a plurality of fins 29 which may extend from the shroud wall and into the airflow. This may substantially increase the thermal conductivity of the shroud thereby increasing the heat dissipation from the coolant. It will be recognised that a similar feature may be added to the hub surface (not shown).

FIG. 8 shows a cross-section B-B' through the vane 17. As shown the vane 17 comprises a fluid passage 30 adjacent to the outer surface or wall of the vane. As illustrated by the arrows the fluid passage is arranged to communicate the coolant along the length of the vane from the leading edge 24a to the trailing edge 25a. As shown coolant may be introduced through inlet 31 from the gearbox and returned to the gearbox from the outlet 32.

Figure 9:
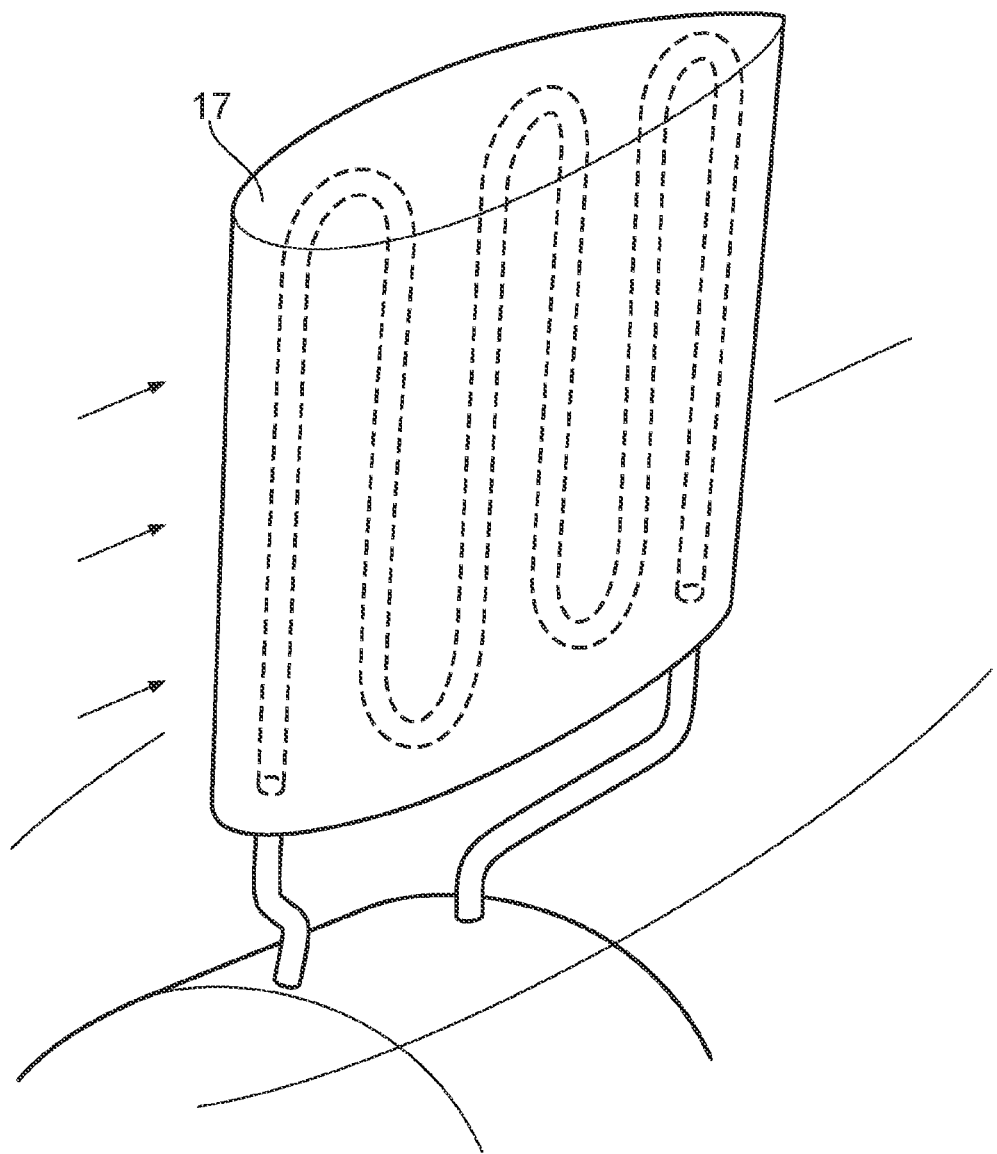
FIG. 9 shows an alternative serpentine arrangement of fluid path.

FIG. 9 shows an alternative serpentine arrangement of fluid path within the vane 17. In such an arrangement the coolant is configured to flow through the vane in an alternating direction from hub to shroud and from the leading edge towards the trailing edge where the coolant outlets from the vane to return to the gearbox. As discussed above the fluid path may advantageously be adjacent to the inner surface of the vane so as to maximise the heat dissipation.

FIGS. 10A, 10B and 10C illustrate arrangements of fluid paths adjacent to the inner surface of the vane (in contrast to the cavity shown in FIG. 8). FIG. 10A corresponds to the arrangement shown in FIG. 9. FIGS. 10B and 10C show examples of fluid paths being arranged along the inner surface of the vane.

Figure 11:
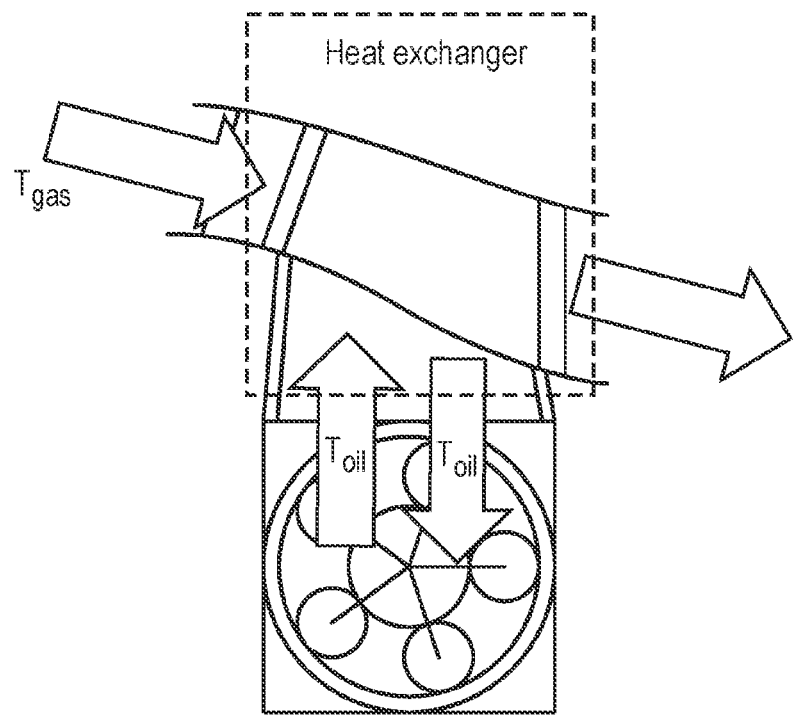
FIGS. 11 and 12 relate to the heat transfer calculations described herein.
Figure 12:
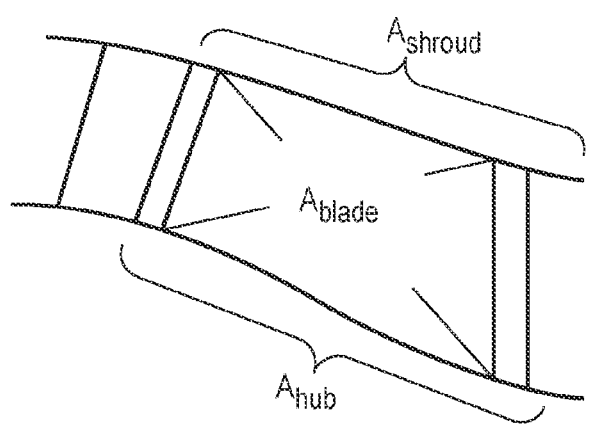

FIGS. 11 and 12 relate to the heat transfer calculations discussed at page 15 below.

Referring to FIG. 11, to remove the generated heat from the gearbox, an oil system is used. The oil which is heated up through the gearbox is then re-directed through the FCB heat-exchanger where the cold air in the core is used as the cooling medium.

To check the feasibility of this concept, the required cooling energy, i.e., the lost energy from the gearbox transmission is compared with the amount of available energy that can be facilitated in the FCB heat exchanger. The amount of available energy for cooling (Preq) is a function of the surface area (AFCB), the heat transfer coefficient (HTCeq) and the temperature difference between the hot and cold side (Toil−Tgas).

$$P_{req} = P_{FAN}(1 - \eta_{Gearbox})$$

$$P_{available} = A_{req} HTC_{eq}(T_{oil} - T_{gas})$$

$$A_{req} = \frac{P_{req}}{HTC_{eq}(T_{oil} - T_{gas})}$$

$$A_{FCB} = A_{endwalls} + A_{struts}$$

The question now becomes: How much surface area is required to keep the temperature of the oil below a certain threshold value. A reasonable maximum temperature of a typical oil is estimated to be 435 K. The heat transfer coefficient (HTC) is a function of the hot and cool medium and is estimated to be HTCgas=200 and HTCoil=3000 and the equivalent HTC thus become:

$$HTC_{eq} = \frac{1}{1/HTC_{gas} + 1/HTC_{oil}} = 188$$

The power of the fan and the core temperature is taken from a representative geared turbofan (VINK, see FIG. 1) with a bypass ratio of 15, overall pressure ratio of 70 and a thrust range of 84 klbf.

$$P_{req} = P_{FAN}(1 - \eta_{Gearbox}) = 15000(1 - 0.995) = 74.85 \text{ kW}$$

$$T_{gas} = 284 \text{ K}$$

$$A_{req} = \frac{P_{req}}{HTC_{eq}(T_{oil} - T_{gas})} = 2.65 \text{ m}^2$$

To assess if the required surface area of the heat exchanger is feasible it is compared to the preliminary layout of the VINK engine. FIG. 12 illustrates the available cooling surface areas. Assuming the FCB in the VINK engine to have 19 struts, the total surface area is sufficient for the heat exchanger to cool the gearbox:

$A_{hub} = 0.793 \text{ m}^2$
$A_{shroud} = 0.852 \text{ m}^2$
$A_{blade} = 1.04 \text{ m}^2$
$\Rightarrow A_{avail} = 2.69 \text{ m}^2$ Aspects of the disclosure extend to a method of cooling a geared turbofan engine gearbox using the airflow within the inlet duct of such an engine.

The invention claimed is:

1. A front center body (FCB) structure for a geared turbofan engine, comprising:
   a central hub and a coaxial shroud spaced from said hub and defining an annular passage between the hub and shroud for communicating air to a compressor; and
   a body including a plurality of vanes extending across the passage from the hub to the shroud,
   wherein one or more of the vanes form a heat exchanging structure that includes a fluid passage contained within the respective vane and extending between a fluid inlet intersecting the hub proximate a leading edge of the vane and a fluid outlet intersecting with the hub proximate a trailing edge of the vane, and
   wherein at least one cavity is provided between inner and outer surfaces of at least one of the vanes to define at least one of the fluid passages.

2. The structure of claim 1, wherein each of the one or more vanes intersects with an outer surface of the hub and an inner surface of the shroud.

3. The structure of claim 1,
   wherein the fluid passage within each respective vane is arranged to communicate a coolant from a gearbox of the geared turbofan engine through the respective vane via a respective inlet and outlet.

4. The structure of claim 3, wherein the fluid passage within each respective vane defines a cooling path extending from the gearbox, or a heat exchanger associated with the gearbox, into the respective vane and back to the gearbox or heat exchanger.

5. The structure of claim 1, wherein each vane has a peripheral wall having an outer surface against which air is configured to flow and an opposing inner surface facing into the vane, wherein the respective fluid passage is arranged to be proximate to the inner surface of the respective vane.

6. The structure of claim 5, wherein the respective fluid passage alternates in direction from the hub towards the shroud and from the shroud towards the hub.

7. The structure of claim 5, wherein the respective fluid passages are in contact with the inner surface of the respective vane.

8. The structure of claim 5, wherein the respective fluid passage includes at least a portion arranged proximate a leading edge of the respective vane.

9. The structure of claim 5, wherein at least one vane fluid passage is in fluid communication with at least one shroud and/or hub cavity to allow fluid to flow there between.

10. The structure of claim 1, wherein the cavity extends from the leading edge of the at least one of the vanes towards the trailing edge thereof.

11. The structure of claim 1, wherein the shroud is provided with a circumferential cavity extending between a radially inward wall and a radially outward wall, said cavity extending along all or part of the axial length of the annular passage.

12. The structure of claim 11, wherein the circumferential cavity of the shroud extends circumferentially between adjacent vanes.

13. The structure of claim 1, wherein the hub is provided with a circumferential cavity extending between a radially inward wall and a radially outward wall, said cavity extending along all or part of an axial length of the annular passage.

14. The structure of claim 13, wherein the circumferential hub cavity extends circumferentially between adjacent vanes.

15. The structure of claim 1, wherein the inlet to the fluid passage is configured to introduce heated fluid at an upstream end of the respective vane and the outlet is configured to output cooled fluid at a downstream end of the respective vane.

16. The structure of claim 1, wherein each vane fluid passage is in fluid communication with an adjacent shroud cavity and/or hub cavity.

17. A geared turbofan engine comprising:
   at least one inlet duct arranged to communicate air to a low pressure compressor; and
   a plurality of vanes disposed within the at least one inlet duct,
   wherein one or more of the plurality of vanes form a heat exchanger that includes a coolant passage contained within the vane for transporting coolant from an upstream end of the vane to downstream end of the vane, the coolant further being in thermal communication with a gearbox of said engine, and
   wherein at least one cavity is provided between inner and outer surfaces of at least one of the vanes to define at least one of the coolant passages.

18. The geared turbofan engine of claim 17, wherein a coolant path is provided between the gearbox and the one or more vanes.

* * * * *